(12) United States Patent
Cheung et al.

(10) Patent No.: US 6,456,711 B1
(45) Date of Patent: Sep. 24, 2002

(54) METHOD FOR PLACING A CALL INTENDED FOR AN ENHANCED NETWORK USER ON HOLD WHILE THE ENHANCED NETWORK USER IS UNAVAILABLE TO TAKE THE CALL USING A DISTRIBUTED FEATURE ARCHITECTURE

(75) Inventors: Eric Cheung, New York, NY (US); Mark Jeffrey Foladare, East Brunswick, NJ (US); Shelley B. Goldman, East Brunswick, NJ (US); Gerald Michael Karam, Morristown, NJ (US); James Christopher Ramming, Palo Alto, CA (US); Roy Philip Weber, Bridgewater, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/735,202

(22) Filed: Dec. 12, 2000

(51) Int. Cl.[7] .................................................. H04M 3/00
(52) U.S. Cl. .............................. 379/265.09; 379/215.01
(58) Field of Search ........................ 379/265.09, 215.01, 379/266.06

(56) References Cited

U.S. PATENT DOCUMENTS 4,811,382 A * 3/1989 Sleevi ........................... 379/67
5,185,782 A * 2/1993 Srinivasan ..................... 379/67
6,178,240 B1 * 1/2001 Walker ........................ 379/266

* cited by examiner

*Primary Examiner*—Ahmad F. Matar
*Assistant Examiner*—Rasha S. Al Aubaidi
(74) *Attorney, Agent, or Firm*—Michele L. Conover

(57) ABSTRACT

A method for placing a call intended for an enhanced network user on hold is disclosed. A calling party is enabled to select the type of information which is provided to the calling party while the calling party is on hold by using a Distributed Feature Network (DFN) architecture. The DFN includes a plurality of feature boxes with each feature box being created for the purpose of enabling a particular communication feature. A call intended for one of a group of ENUs is received by the DFN and an estimated hold time is determined for the call. The hold time is communicated to a caller associated with the call and the caller is provided with a list of options for information to be received by the caller while the caller is on hold. The caller's selection of a hold option is received by the DFN. A feature box is created for providing the caller with the selected information option, and the call is connected to the created feature box. When the DFN determines that one of the group of ENUs is available, the call is rerouted from the created feature box to the available ENU.

14 Claims, 4 Drawing Sheets

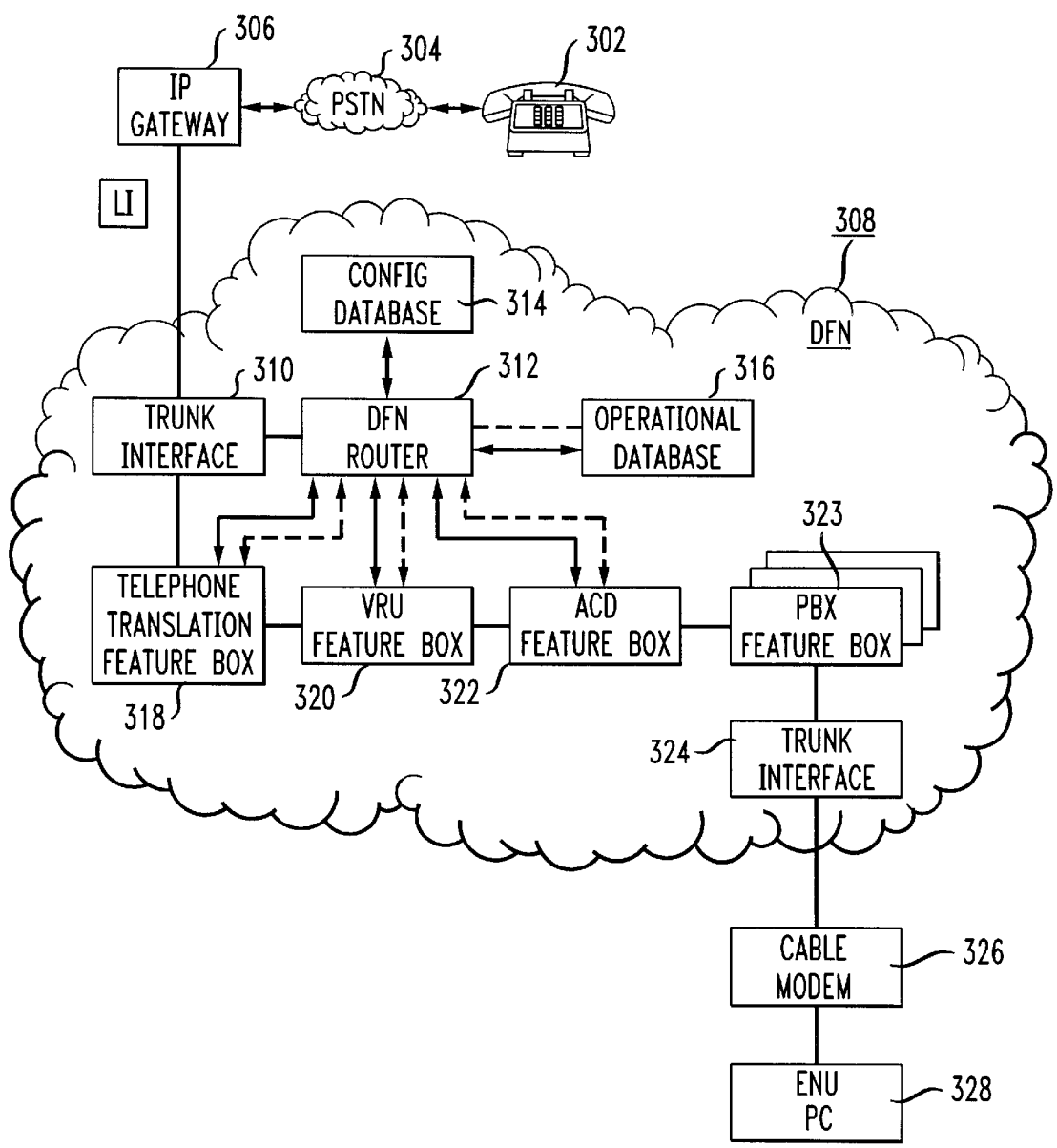

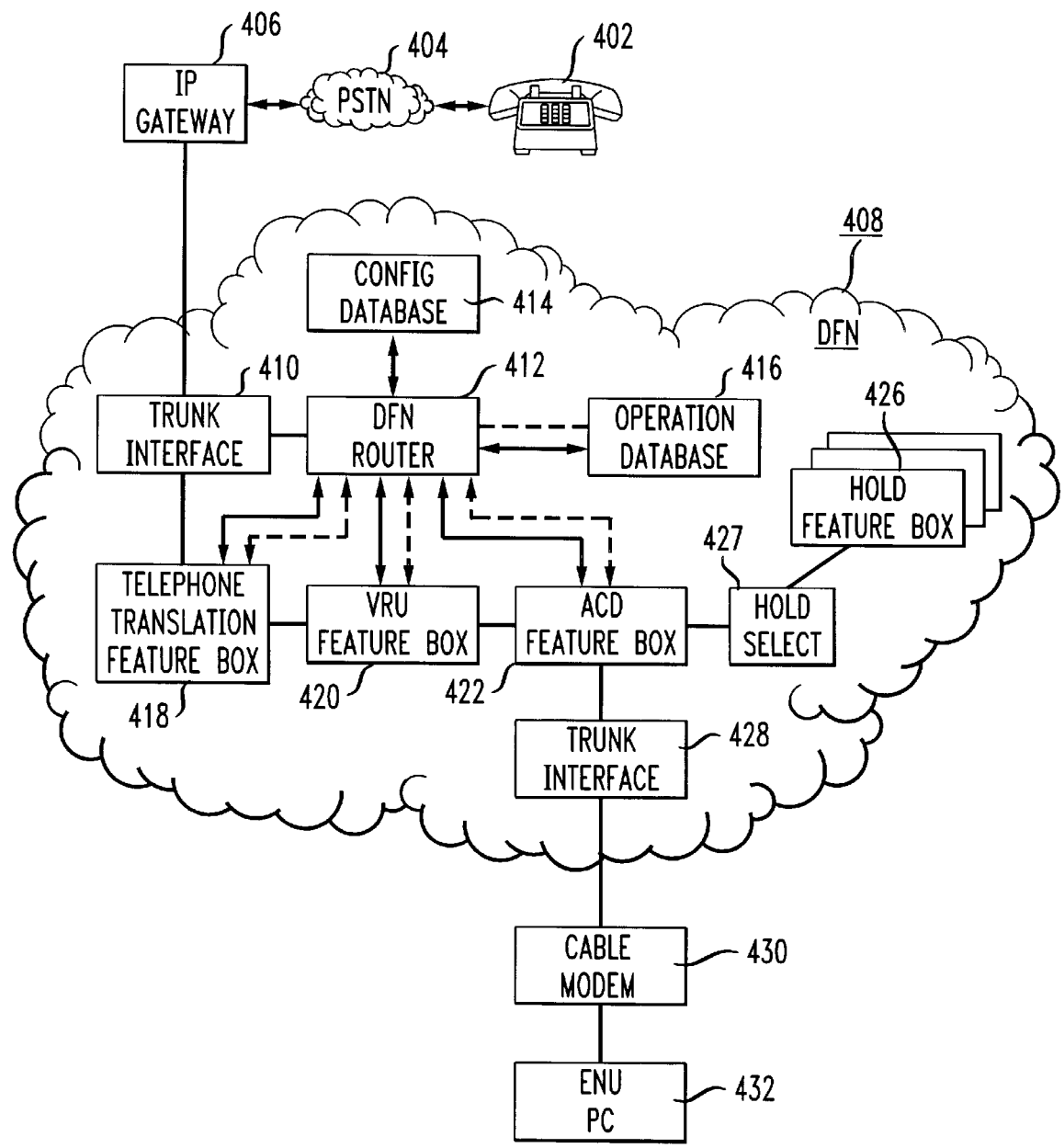

METHOD FOR PLACING A CALL INTENDED FOR AN ENHANCED NETWORK USER ON HOLD WHILE THE ENHANCED NETWORK USER IS UNAVAILABLE TO TAKE THE CALL USING A DISTRIBUTED FEATURE ARCHITECTURE

TECHNICAL FIELD

The present invention relates to a method for placing a call for an enhanced network user on hold, and more particularly, to a method for placing a call intended for an enhanced network user on hold which allows a calling party to select the type of information which is provided to the calling party while the calling party is on hold by using a distributed feature architecture.

BACKGROUND OF THE INVENTION

In the network architectures currently used for most voice and data communications, such as the Public Switched Telephone Network, intelligence is concentrated at central locations to allow for complicated functions to be implemented on a widespread basis. Network elements which may be utilized to carry out these functions include network databases and Automatic Call Distributors (ACDs). Such functions may include complex routing instructions as may be required in directing calls to call centers with multiple geographic locations and services which use calling cards. In the case of call center services, multiple calls are routed to ACDs at the same time causing the calls to be placed in queues. Typically, ACDs are located on the call center premises and owned and operated by the call center. The expense involved in obtaining and operating the ACDs is significant.

Another phenomenon which is affecting how communication services are being provided is due to the fact that many employees are now able to work out of their homes, commonly referred to as telecommuting. In order for telecommuters to effectively perform their jobs, there is a need for the telecommuter to have access to sophisticated communication services such as company databases and other software, as well as telecommunication features such as conference calling and call forwarding. It is very expensive to provide telecommuters with the equipment required to be able to provide these services. There is a need to provide telecommuters with the ability to have sophisticated communication control functionality in a cost effective manner.

One solution to this problem is to provide the communication control functionality in the network and make it accessible to the telecommuter. Such a solution is described in commonly assigned, co-pending patent application Ser. No. 09/318015 filed May 25, 1999 entitled "Method and System for Providing Communication Control Functionality at a Remotely Located Site" which is incorporated by reference herein.

Even with the provision of communication control functionality in the network, it is sometimes necessary to place a calling party on hold because there are more incoming calls than there are available agents to take the calls. Typically, in such a situation, the caller is forced to listen to informational material which is selected by the operator of the call agent, such as music or advertisements. It would be beneficial for the calling party to be able to have some choice in the type of information he or she receives when the calling party is on hold.

SUMMARY OF THE INVENTION

The present invention is directed to a method for placing a call intended for an enhanced network user on hold which allows a calling party to select the type of information which is provided to the calling party while the calling party is on hold by using a Distributed Feature Network (DFN) architecture. The DFN comprises a plurality of feature boxes with each feature box being created for the purpose of enabling a particular communication feature. A call intended for one of a group of ENUs is received by the DFN and an estimated hold time is determined for the call. The hold time is communicated to a caller associated with the call and the caller is provided with a list of options for information to be received by the caller while the caller is on hold. The caller's selection of a hold option is received by the DFN. A feature box is created for providing the caller with the selected information option, and the call is connected to the created feature box. When the DFN determines that one of the group of ENUs is available, the call is rerouted from the created feature box to the available ENU.

BRIEF DESCRIPTION OF THE DRAWINGS

The present invention is illustrated by way of example and not limitation in the accompanying figures in which like reference numerals indicate similar elements and in which:

FIG. 3 is a block diagram of the system of FIG. 1 which illustrates how the enhanced network user receives an incoming communication from a third party caller in accordance with the present invention; and FIG. 4 is a block diagram of the system of FIG. 1 which illustrates how a third party caller may be placed on hold when an enhanced network user is not available to accept the third party caller's call in accordance with the present invention.

DETAILED DESCRIPTION

Figure 1:
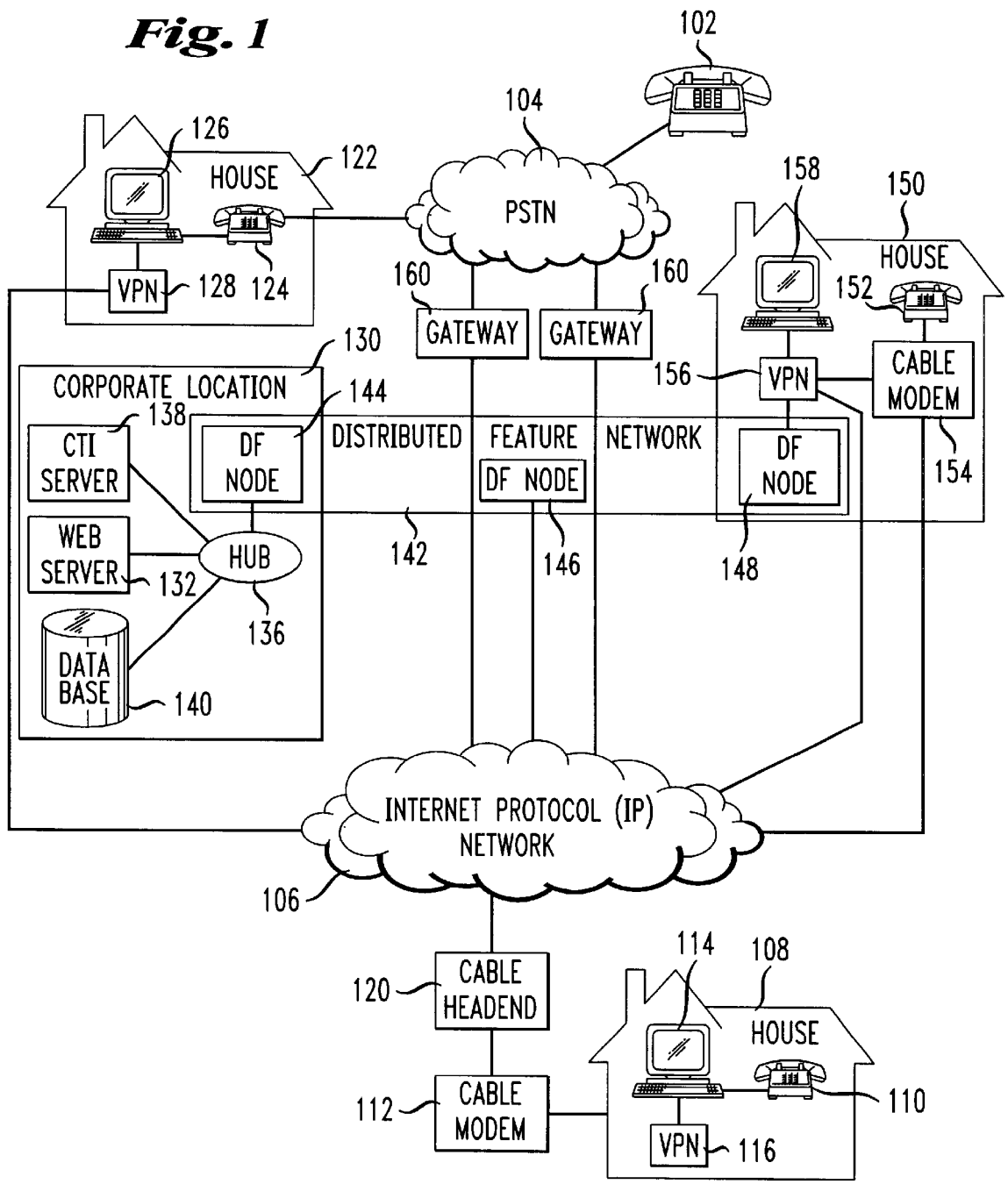
FIG. 1 illustrates a block diagram of a system for implementing communication control functionality at a remotely located site in accordance with the present invention.

FIG. 1 illustrates a system for implementing communication control functionality at a remotely located site using a distributed feature architecture in accordance with the present invention. It is to be understood that the present invention is being described in the context of a user (such as one at location 108, 122 or 150) being able to access network capabilities to be able to perform desired functions at his location without the need for specialized telecommunications equipment or elaborate network connections.

The type of applications which may be employed by the user are of the type which might normally be required in a workplace environment, such as, but not limited to call center software applications or other type of office related applications such as conferencing, access to corporate databases and software and various other applications. In addition, communications between a user of such network capabilities and a third party which does not have access to these capabilities will also be discussed hereafter.

For ease of explanation, a user of the network features contemplated by the present invention will be referred to hereinafter as an enhanced network user (ENU). A third party trying to reach an ENU will be referred to as a third party caller (TPC). The manner in which a TPC or ENU may connect to the network elements is fully described in co-pending application Ser. No. 09/318015 filed May 25,1999 entitled "Method and System for Providing Communication Control Functionality at a Remotely Located Site" which, as indicated above, is incorporated by reference herein. The types of communication applications which may be used by the ENU are further described in co-pending applications Ser. No. 09/492594 filed Jan. 27, 2000, entitled "Virtual Contact Center With Flexible Staffing Control"; Ser. No. 09/490887 filed Jan. 27, 2000, entitled "Control of Merchant Application by System Monitor in Virtual Contact Center"; and Ser. No. 09/370766 filed Aug. 9, 1999, entitled "Method and System for Providing Enhanced Call Service Features at Remote Locations" each of which is incorporated herein by reference.

An ENU may connect to a distributed feature network 142 in a number of ways. The distributed feature network (DFN) 142 is the mechanism by which the ENU is able to obtain and utilize the enhanced network features the ENU needs to perform his or her desired tasks. The DFN 142 comprises a number of nodes where feature logic resides and executes. These Distributed Feature Nodes (DF Nodes) can be deployed at various locations in the network, such as DF Node 144 in corporate location 130, DF Node 148 in ENU home 150, and a network resident DF Node 146. Each DF Node is comprised of a DFN router, trunk interfaces, feature boxes, a configuration database and an operational database as will be made more apparent hereinafter.

An ENU at a first location 108 accesses the DFN 142 by using either a telephone 110 and/or a personal computer (PC) 114 to connect via a cable modem 112 to a cable headend 120 which is connected to the Internet 106. It to be understood by those skilled in the art that instead of the Internet 106, the ENU could connect to an Intranet or other type of wide area network. The ENU must log in prior to gaining access to the DFN 142.

In addition to logging into the DFN 142, an ENU may also be required to authenticate their identity. Authentication may occur through any known means. Identifying characteristics that have been employed in authentication techniques include: voice samples, fingerprints, retina patterns, personal appearance, handwriting and even the manner in which a wave is polarized as it passes through a portion of the body. Another method employed to obtain such an alleged identity is to require the requester to enter some type of a code. This code may be typed in via a keypad or scanned from a device in the requester's possession and may comprise a login identification and password or a pseudorandom code generated by a security device. In addition, smart cards or digital certificates can be used to authenticate the ENU.

For example, the ENU may log into the DFN 142 by entering an appropriate login name and password either by typing or speaking the login name and password into the PC 114 or speaking the login name and password into the telephone 110. A web server 132 and database 140 which contain all of the data needed to run the various applications required by the ENU are accessible to the DFN 142 via a hub 136 which is preferably a router.

A two line solution can be used to connect to the DFN 142. An ENU located at house 122 can use a telephone 104 to connect to the Public Switched Telephone Network (PSTN) 104. The PSTN 104 can then connect via a gateway 160 to the Internet 106. The ENU's PC 126 can also connect through a Virtual Private Network (VPN) 128 to the Internet 106. As indicated above, in order for the ENU PC 126 to access the DFN 142 it must first log in. Once logged in, the ENU PC 126 can connect to the corporate web server 132 and database 140 via a hub 136.

An ENU may also directly connect to the DFN 142. A telecommuter located at house 150 may connect to a virtual private network (VPN) 156 via a PC 158 which is directly connected both to the Internet 106 and the DFN 142.

The specifics of how the DFN 142 operates in order to provide various multimedia services is described in co-pending patent applications Ser. No. 09/034,681 entitled "Telecommunication System and Method" which was filed on Mar. 4, 1998 and provisional application serial No. 60/154877, filed Sep. 20, 1999, entitled "Routing Extensions for Telecommunications Network System and Method" both of which are incorporated by reference herein. In accordance with the present invention, the distributed feature network can be used to implement communication control functionality to an enhanced network user by providing the functionality via the network rather than by requiring the enhanced network user to have specialized equipment. Each feature box required to implement a particular communication feature or features is created by the DFN as needed. When the feature or features is no longer needed, the feature box is eliminated thereby allowing the DFN to virtually create each communication feature.

Because of the dynamic nature of the DFN in that feature boxes are created and destroyed based on the network functional requirements of a particular ENU, the present invention will be described in conjunction with a number of network diagrams which illustrate various network functionalities which may be required to practice the present invention. It is to be understood by those skilled in the art that these diagrams are merely a sampling of the type of functionality which may be implemented using the present invention, and not an exhaustive catalog of all network functionalities available to any given ENU.

Figure 2:
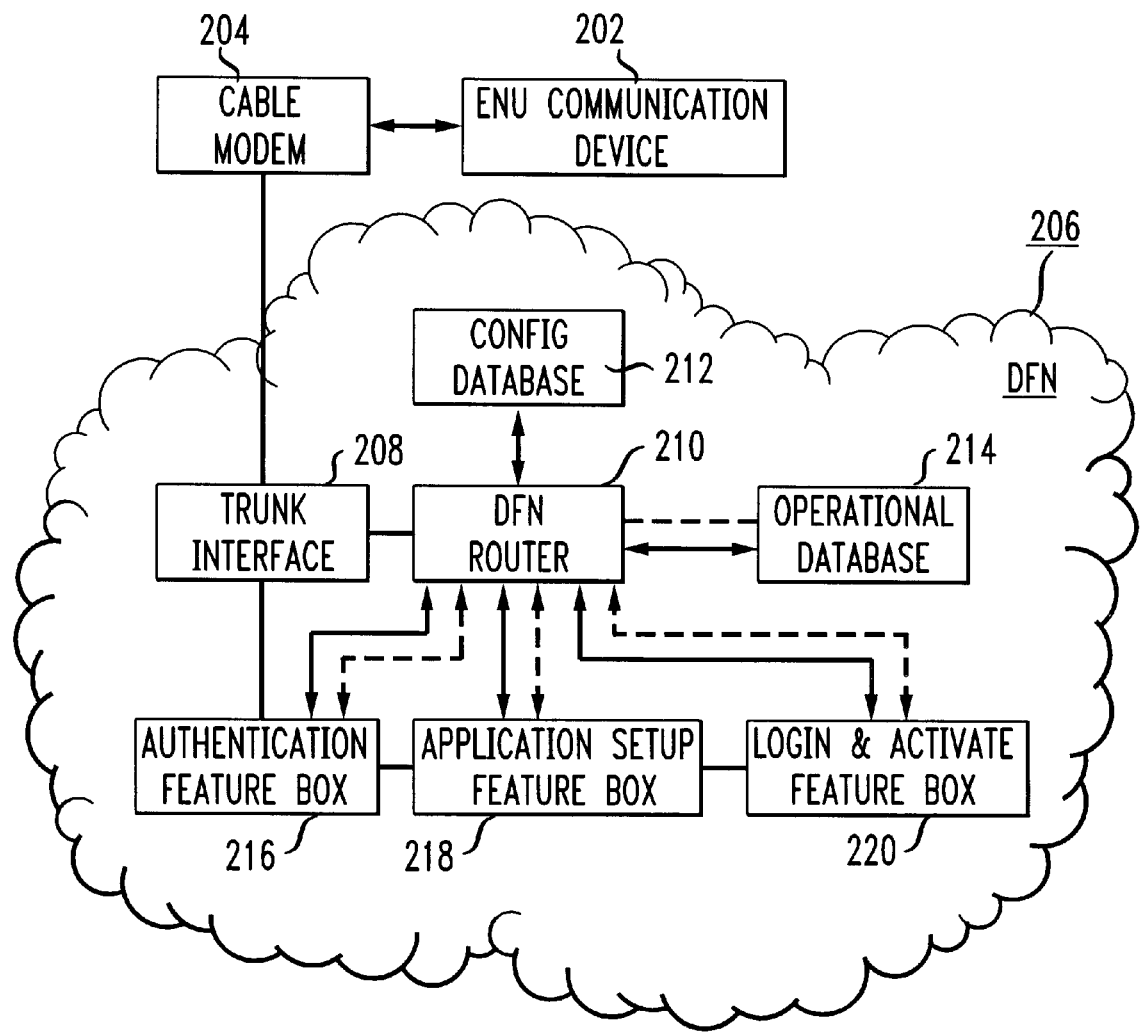
FIG. 2 is a block diagram of the system of FIG.1 which illustrates how an enhanced network user may log onto a communication network to achieve communication control functionality in accordance with the present invention.

FIG. 2 illustrates an architecture which may be used to have an ENU log onto a DFN 206. The DFN 206 provides the ENU with the data and software required to obtain sophisticated multimedia features such as, but not limited to, conferencing, call forwarding, downloading of databases, spreadsheets and forms, etc. Types of uses for the DFN 206 include call center applications for remote call center workers and office-type applications for telecommuters. DFN 206 may be made up of a number of DF Nodes. Each DF Node is responsible for providing the ENU with a particular communication functionality.

The DFN is comprised of a plurality of feature boxes (e.g., authentication feature box 216). The feature boxes communicate with an operational database 214 for the storage and retrieval of data. For example, a feature box may access TPU records to determine if a TPU's information matches information kept on file for that particular TPU. Another example would be the retrieval of data which represents which ENUs (e.g., call agents) are busy and the size of a queue for a particular ENU. Other data which may be accessed from the operational database 214 includes customer profiles, inventories and various forms.

An example of how an ENU may gain access to the DFN 206 will now be described. An ENU communication device 202, such as a PC, connects to a DFN 206 via a cable modem 204 by dialing an access number. A trunk interface 208 located within the DFN 206 receives the access number and forwards the number to a DFN router 210. The DFN router 210 then looks up the access number in a configuration database 212 to determine which feature box or boxes need to be accessed. The configuration database 212 provides data which pertains to call set up and determines which feature boxes are required to accomplish the call set up and in which order the feature boxes need to be accessed.

In an embodiment of the present invention, the translation of the access number may be used to determine login criteria for the ENU. The IP address of the ENU communication device may also be received by the DFN router 210. In the present example, the DFN database determines that an ENU associated with the ENU communication device 202 must log in. The authentication feature box (FB) 216 requires that the ENU associated with the ENU communication device 202 provide login information, such as a login name and password.

Assuming that a valid login name and password are received, the authentication FB 216 would compare the login name and password to a table containing valid login names and passwords residing in the operational database 214 to log in the ENU associated with the ENU communication device 202. Once logged in, application FB 218 would be created to allow the ENU associated with the ENU communication device 202 to have access to the operational database 214 as well as additional feature boxes in the DFN 206.

The application FB 218 represents the set of feature boxes that would be set up to allow the ENU communication device 202 to have access to software applications maintained by the operational database 214. The types of application feature boxes which may be required by the ENU include feature boxes for creating order forms, viewing customer records, and for checking inventory stock. In an example where the ENU is a contact center agent who is logging into the contact center to begin receiving calls, a login and activate FB 220 is created to update the status of the ENU in the operational database 214 to indicate that the ENU is available to receive incoming calls.

FIG. 3 illustrates a system for receiving an incoming call intended for an ENU in accordance with the present invention. A Third Party Caller (TPC) places a call to an ENU using a telephone 302. It is to be understood by those skilled in the art that the TPC may use another type of communication device such as, but not limited to, a wireless telephone, a computer with telephony software or a personal communication device without departing from the scope and spirit of the present invention. The call is communicated over the Public Switched Telephone Network (PSTN) 304 to an IP gateway 306. In accordance with one embodiment of the present invention, the routing of the call to the IP gateway 306 is the result of the translation of the dialed number inputted into telephone 302 by the caller by a network database (not shown) located within the PSTN 304. The translation would indicate the routing instructions which would include routing to the IP gateway 306. The dialed number may be a toll free number such as an 8## number or any other type of telephone number which would be recognized by the PSTN 304 as requiring translation for routing purposes.

The IP gateway 306 would then route the call to a trunk interface 310 which is located within the DFN 308. The DFN 308 is preferably a packet-based network such as the Internet or an intranet. The trunk interface 310 would then route the call to a DFN router 312. Included with the call may be the dialed number (DNIS) as well as the number from which the called originated (ANI). Other information to the extent it may affect further routing of the call such as, but not limited to, time of day, day of week, geographic area of origination may also be communicated with the call.

The DFN router 312 would then communicate with the configuration database 314 to determine what features need to be created to handle the incoming call. For each feature that is required, a feature box is created. In the present example being described in conjunction with FIG. 3, it is assumed that the TPC is attempting to reach a call center representative, in the present example ENU PC 328.

The trunk interface 310 would first route the call and the additional information mentioned above to a Telephone Number Translation (TNT) feature box 318. The TNT feature box 318 would then communicate with the operational database 316 via the DFN router 312 to perform a lookup of the configuration database 314 and then determine further routing instructions for the call. In the present example, the telephone number translation indicates that the call is directed to a call center representative. Based on various factors such as, but not limited to, where the call originates (e.g., ANI), the time of day and day of week, an initial determination of specifically where the call should be routed is determined.

Next the configuration database 314 has determined that a Voice Response Unit (VRU) feature box 320 is needed to get further information from the TPC. A connection is established between the VRU feature box 320 and the TPC's telephone 302 to obtain specific information from the TPC. Such information may include the purpose of the call (e.g., to place an order, register a complaint, speak with customer service), or the urgency of the call. The TPC may provide the requested information in any of a number of conventional ways for responding to a VRU including Dual Tone Multi-frequency (DTMF) tones or voice response. Based on the information provided by the TPC which is then forwarded to the operational database 316, the ultimate destination of the call may be altered.

Once the final routing for the call has been determined by the configuration database 314, the call is forwarded to an Automatic Call Distributor (ACD) feature box 322 which will connect the TPC to the designated ENU PC 328, when the ENU PC 328 is available to receive the call. As with any ACD, if there are more callers than call center representatives to answer the calls, queues will be formed for one or more of the call center representatives to manage the call flow. The ACD feature box 322 can also redistribute calls if it determines that calls can be handled in a more expedited fashion. The ACD feature box 322 may also communicate with one or more PBX feature boxes 323. The PBX feature boxes 323 provide features which are similar to a conventional PBX such as, but not limited to, hold, conferencing, and transfer. Once the ENU PC 328 is available to take the call from the TPC, a trunk interface 324 communicates the call to the ENU PC 328 via a cable modem 326.

In accordance with the present invention, an embodiment will now be described which pertains to a common situation faced by third party callers; what happens to the TPU call when the ENU is not immediately available to receive the call. As is well known in the art, many times a call center receives more incoming calls than there are available agents. In order to handle each call in an effective manner, the calls are placed in one or more phone queues which are associated with a particular call center agent.

Many times factors are taken into consideration when assigning a call to a particular call center agent. Such factors may include, but are not limited to, the geographical location from which the call originates, the time of day, day of week, the nature of the call (e.g., to place an order, speak with customer service, etc.), and whether the caller is a repeat customer. Examples of methods which are used to determine routing of these calls are described in U.S. Pat. No. 4,737, 983, entitled "Automatic Call Distributor Telephone Service which issued on Apr. 12, 1988 and U.S. Pat. No. 5,164,983, entitled "Telemarketing Complex Performance Management Service which issued on Nov. 17, 1992, both assigned to AT&T Corp. and are incorporated herein by reference.

FIG. 4 illustrates a system for placing a call intended for an ENU on hold using a distributed feature architecture in accordance with the present invention. A TPC places a call using a telephone 402 over the PSTN 404 which is intended to be ultimately connected to an ENU. The particular ENU will be selected by the DFN 408 as will be described hereinafter. The call is carried over the PSTN 404 to an IP gateway 406. As described above, the routing of the call to the IP gateway 406 is the result of the translation of the dialed number inputted into telephone 402 by the caller by a network database (not shown) located within the PSTN 404. The translation would indicate the routing instructions which would include routing to the IP gateway 406. The dialed number may be a toll free number such as an 8## number or any other type of telephone number which would be recognized by the PSTN 404 as requiring translation for routing purposes.

The IP gateway 406 would then route the call to a trunk interface 410 which is located within the DFN 408. The trunk interface 410 would then route the call to a DFN router 412. Included with the call may be the dialed number (DNIS) as well as the number from which the called originated (ANI). Other information to the extent it may affect further routing of the call such as, but not limited to, time of day, day of week, geographic area of origination may also be communicated with the call.

The trunk interface 410 would first route the call and the additional information mentioned above to a Telephone Number Translation (TNT) feature box 418. The TNT feature box 418 would then communicate with the operational database 416 via the DFN router 412 to perform a lookup of the configuration database 414 and then determine further routing instructions for the call. In the present example, the telephone number translation indicates that the call is directed to a call center representative. Based on various factors such as, but not limited to, where the call originates (e.g., ANI), the time of day and day of week, an initial determination of specifically where the call should be routed is determined. Based on some of the information received from the TPC (e.g., ANI), a customer profile for the TPC may also be retrieved from the configuration database to help determine the routing of the call. Factors such as, but not limited to the number of orders placed by the TPC, the cost of each order, referrals made by the TPC, etc. may also be considered.

Next the configuration database 414 has determined that a Voice Response Unit (VRU) feature box 420 is needed to get further information from the TPC. A connection is established between the VRU feature box 420 and the TPC's telephone 402 to obtain specific information from the TPC. Such information may include the purpose of the call (e.g., to place an order, register a complaint, speak with customer service), or the urgency of the call. The TPC may provide the requested information in any of a number of conventional ways for responding to a VRU including Dual Tone Multi-frequency (DTMF) tones or voice response. Based on the information provided by the TPC which is then forwarded to the operational database 416, the ultimate destination of the call may be altered.

As is consistent in the call center art, an algorithm may be applied by an ACD FB 422 to determine which ENU or group of ENUs will receive the TPC's call based on one or more of the factors mentioned above. Examples of systems which include schemes for allocating calls are the Definity Enterprise communication server manufactured by Lucent Technologies, Inc. The types of schemes that these systems employ include first in/first out of queue algorithms, priority in queue based on information derived from Computer Telephone Integration (CTI) applications matching Interactive Voice Response (IVR) and ANI information to an account, and routing by split based on IVR information. In addition to determining the ENU or group of ENUs that will receive the call, the ACD FB 422 will also determine the size of the queue, if any, for that ENU or group of ENUs and estimate the hold time for the TPC. Hold time may be estimated by considering a number of factors, such as, but not limited to average length of call, and number of calls in queue. A hold select Feature Box (FB) 427 then announces the estimated hold time to the TPC so that the TPC can better decide what the TPC would like to listen to while he/she is on hold.

In accordance with the present invention, the hold select FB 427 presents to the TPC a menu of choices for where his or her call can be directed while the TPC is waiting for the ENU or group of ENUs to become available. Among the types of choices available to the TPC include music, news, advertisements, information sources or one of a few selected web sites if the TPC is using an Internet-enabled device such as a computer or wireless Internet-enabled device. Other options which may be available to the TPC are the ability to play games, leave a message for the ENU or request a call back from the ENU.

The menu may be presented to the TPC in a number of different ways. The hold select FB 427 may announce the options to the TPC and allow the TPC to select by pressing a particular key on the TPC telephone 402 or by saying his or her selection and using speech recognition technology to receive the selected option. Alternatively, if the TPC is calling from a computer or wireless device having a display, the hold select FB 427 may present a screen to the TPC and the TPC may use a mouse or other type of pointer to select a particular option.

Once the TPC has selected an option, the hold select FB 427 routes the call to a hold FB 426 that is created which corresponds to the selected option. The TPC then remains at the hold FB 426 until the ENU or group of ENUs becomes available to accept the call. When the ENU or group of ENUs becomes available, the ACD FB 422 tears down the call to the hold select FB 427 and sets up the call to the ENU or group of ENUs via a trunk interface 428, cable modem 430 and ENU PC 432.

The TPC may be periodically informed of updated estimated holding times by the hold select FB 427. The TPC may at any time select to leave a message or have the ENU call him or her back. If the TPC requests the ENU to call him or her back, the ACD FB 422 may use the TPC's ANI or may alternatively send the TPC to the VRU FB 420 to collect the TPC's telephone number in order to retrieve the TPC's customer profile and create a message to be sent to the ENU PC 432 requesting the call back. The TPC's telephone number may be placed in the operational database 416. When the ENU PC 432 is available, the TPC's telephone number is retrieved from the operational database 416 and the ENU PC 432 can use the ACD FB 422 to place an outbound call to the TPC. Alternatively, the ACD FB 422 may automatically retrieve the TPC's telephone number from the operational database 416 and place a call to the TPC telephone 402 when the ENU PC 432 is available. The customer profile may then be transmitted to the ENU PC 432 so that the ENU may better handle the call.

While the present invention has been described in connection with the illustrated embodiments, it will be appreciated and understood that modifications may be made without departing from the true spirit and scope of the invention. For example, while the present invention is described with reference to call center applications, it can be appreciated that the present invention may be used in any situation in which a user is working remotely from a centralized workplace. Examples of such users are telecommuters and remote schooling programs. It is to be understood that the particular embodiments shown and described by way of illustration are in no way intended to be considered limiting. Therefore, references to details of particular embodiments are not intended to limit the scope of the claims, which in themselves recite only those features regarded as essential to the invention.

We claim:

1. A method for placing a call intended for one of a group of Enhanced Network Users (ENUs) on hold in which a calling party selects the type of service which is provided to the calling party while the calling party is on hold, the call being placed to the ENU via a Distributed Feature Network (DFN), the DFN comprises a plurality of feature boxes, each feature box being created in response to a need for a particular communication feature, the method comprising the steps of:

receiving a call intended for one of a group of ENUs;

providing a caller associated with the call with a list of options for services to be engaged by the caller while the caller is on hold;

receiving the caller's selection of a hold option;

in response to the caller's selection, creating a feature box for providing the caller with the selected service option, the created feature box being added to the DFN; and connecting the call to the created feature box.

2. The method of claim 1 further comprising the steps or:

determining if one of the group of ENUs is available; and if available rerouting the call from the created feature box to the available ENU.

3. The method of claim 1 wherein the group of ENUs are call center agents.

4. The method of claim 1 wherein the service provides music to the calling party.

5. The method of claim 1 wherein the service provides news to the calling party.

6. The method of claim 1 wherein the service provides one or more advertisements to the calling party.

7. The method of claim 1 wherein the service provides one or more games to the calling party.

8. The method of claim 1 wherein the estimated hold time is determined by an Automatic Call Distributor (ACD) Feature Box (FB).

9. The method of claim 8 wherein said ACD FB also determines to which ENU the call is to be routed.

10. The method of claim 1 wherein said step of receiving a call intended for one of a group of ENUs further comprising the steps of:

determining an estimated hold time for the call; and communicating the hold time to the caller.

11. The method of claim 1 wherein the service allows the calling party to request that an ENU call the calling party back at a later time.

12. The method of claim 11 wherein the ENU calls the calling party back when the ENU becomes available.

13. The method of claim 11 wherein the ENU calls the calling party back at a time selected by the calling party.

14. The method of claim 11 wherein the ENU calls the calling party back at a time mutually convenient to the ENU and the calling party.

* * * * *